US010860000B2

(12) United States Patent
Omi et al.

(10) Patent No.: US 10,860,000 B2
(45) Date of Patent: Dec. 8, 2020

(54) POWER SYSTEM STABILIZATION SYSTEM AND METHOD

(71) Applicant: Hitachi, Ltd., Tokyo (JP)

(72) Inventors: Shota Omi, Tokyo (JP); Masatoshi Kumagai, Tokyo (JP); Kenichiro Yamane, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 548 days.

(21) Appl. No.: 15/566,461

(22) PCT Filed: Apr. 24, 2015

(86) PCT No.: PCT/JP2015/062464
§ 371 (c)(1),
(2) Date: Oct. 13, 2017

(87) PCT Pub. No.: WO2016/170666
PCT Pub. Date: Oct. 27, 2016

(65) Prior Publication Data
US 2018/0120818 A1    May 3, 2018

(51) Int. Cl.
*G05B 19/4093* (2006.01)
*H02J 3/24* (2006.01)
(Continued)

(52) U.S. Cl.
CPC . *G05B 19/40937* (2013.01); *G05B 19/41885* (2013.01); *G05F 1/66* (2013.01);
(Continued)

(58) Field of Classification Search
CPC ........ G05B 19/40937; G05B 19/41885; G05F 1/66; H02J 3/18; H02J 3/24; H02J 3/38; H02P 9/105
(Continued)

(56) References Cited

U.S. PATENT DOCUMENTS 5,483,147 A * 1/1996 Ilic .................. H02P 9/102
290/52
6,064,172 A * 5/2000 Kuznetsov ........... G01R 31/346
318/434
(Continued)

FOREIGN PATENT DOCUMENTS

EP    1 852 952 A1    11/2007
JP    7-250431 A      9/1995
(Continued)

OTHER PUBLICATIONS

Extended European Search Report issued in counterpart European Application No. 15889905.4 dated Oct. 16, 2018 (seven pages).
(Continued)

*Primary Examiner* — Rexford N Barnie
*Assistant Examiner* — Brian K Baxter
(74) *Attorney, Agent, or Firm* — Crowell & Moring LLP

(57) ABSTRACT

It is possible by means of a system simulation device to extract a disturbance mode wherein multiple accident conditions are assumed and to determine control parameters, but when the number of accident conditions increases, a threshold value pertaining to a divergence constant deviates prior to an update period, with the result that an uncontrollable disturbance mode appears. In order to solve this problem, the present invention is a power system stabilization system for determining control parameters for a control device connected to a power system, the power system stabilization system equipped with: a disturbance mode prediction unit for predicting a disturbance mode of a power system on the basis of operation information and an assumed system configuration for the power system; a post-control parameter update period prediction unit for predicting an update period for a post-control parameter in post-control after a disturbance has occurred; a threshold value setting unit for setting a threshold value pertaining to a divergence constant on the
(Continued)

basis of the disturbance mode and the update period for the post-control parameter; and a control parameter determination unit for determining a control parameter of the control device on the basis of the disturbance mode and the threshold value.

13 Claims, 11 Drawing Sheets

(51) Int. Cl.
- *G05B 19/418* (2006.01)
- *G05F 1/66* (2006.01)
- *H02J 3/18* (2006.01)
- *H02P 9/10* (2006.01)
- *H02J 3/38* (2006.01)

(52) U.S. Cl.
CPC .................................. *H02J 3/18* (2013.01); *H02J 3/24* (2013.01); *H02P 9/105* (2013.01); *H02J 3/38* (2013.01)

(58) Field of Classification Search
USPC .......................................................... 307/34
See application file for complete search history.

(56) References Cited

U.S. PATENT DOCUMENTS

| | | | |
|---|---|---|---|
| 6,476,521 B1* | 11/2002 | Lof | H02J 3/24 307/102 |
| 2003/0057924 A1* | 3/2003 | Shimomura | H02P 9/305 322/28 |
| 2003/0076075 A1* | 4/2003 | Ma | H02J 3/1864 323/209 |
| 2003/0200038 A1* | 10/2003 | Schweitzer, III | H02H 1/0007 702/65 |
| 2004/0124812 A1* | 7/2004 | Delmerico | H02J 3/24 322/29 |
| 2009/0088990 A1* | 4/2009 | Schweitzer, III | G01R 19/2513 702/58 |
| 2009/0240382 A1* | 9/2009 | Mitani | H02J 3/24 700/298 |
| 2011/0050139 A1* | 3/2011 | Ichiki | H02P 25/024 318/400.34 |
| 2012/0050053 A1* | 3/2012 | Kim | H02P 9/102 340/635 |
| 2012/0112713 A1* | 5/2012 | Kuehn | H02J 3/24 323/207 |
| 2012/0228941 A1* | 9/2012 | Sakai | H02J 3/383 307/66 |
| 2012/0271575 A1* | 10/2012 | Tumilty | H02J 3/38 702/60 |
| 2012/0277930 A1* | 11/2012 | Ebata | H01L 31/02021 700/295 |
| 2012/0316696 A1* | 12/2012 | Boardman | H02J 13/0079 700/297 |
| 2013/0041604 A1* | 2/2013 | Wiszniewski | H02P 9/105 702/58 |
| 2013/0073109 A1* | 3/2013 | Cheng | H02J 3/40 700/298 |
| 2013/0116842 A1* | 5/2013 | Saito | H02J 13/00 700/291 |
| 2013/0176648 A1* | 7/2013 | De Kock | H02P 9/009 361/23 |
| 2013/0214537 A1* | 8/2013 | Hashimoto | F03D 15/00 290/55 |
| 2013/0265030 A1* | 10/2013 | Kuroda | H02J 3/386 323/318 |
| 2014/0032138 A1* | 1/2014 | Shrestha | G01R 31/40 702/58 |
| 2014/0070617 A1* | 3/2014 | Detmers | H02J 3/24 307/64 |
| 2014/0074311 A1* | 3/2014 | Kearns | H02J 3/24 700/297 |
| 2014/0136178 A1* | 5/2014 | Meagher | G06N 5/047 703/18 |
| 2015/0001939 A1* | 1/2015 | Kojima | G06G 7/14 307/52 |
| 2015/0042093 A1* | 2/2015 | Gomis Bellmunt | H02J 3/24 290/44 |
| 2015/0194966 A1* | 7/2015 | Kimura | G05B 15/02 700/287 |
| 2016/0084919 A1* | 3/2016 | Gokaraju | H02H 7/065 702/182 |
| 2016/0187910 A1* | 6/2016 | Moreno | G06Q 10/06 700/297 |
| 2016/0259399 A1* | 9/2016 | Chu | H02J 3/38 |
| 2018/0054058 A1* | 2/2018 | Kumagai | H02J 3/24 |
| 2018/0054059 A1* | 2/2018 | Yamazaki | H02J 3/24 |

FOREIGN PATENT DOCUMENTS

| | | |
|---|---|---|
| JP | 11-222545 A | 8/1999 |
| JP | 2007-325359 A | 12/2007 |
| JP | 2011-61911 A | 3/2011 |

OTHER PUBLICATIONS

International Search Report (PCT/ISA/210) issued in PCT Application No. PCT/JP2015/062464 dated Jun. 30, 2015 with English translation (Two (2) pages).

Japanese-language Written Opinion (PCT/ISA/237) issued in PCT Application No. PCT/JP2015/062464 dated Jun. 30, 2015 (Three (3) pages).

* cited by examiner

[Fig. 1]
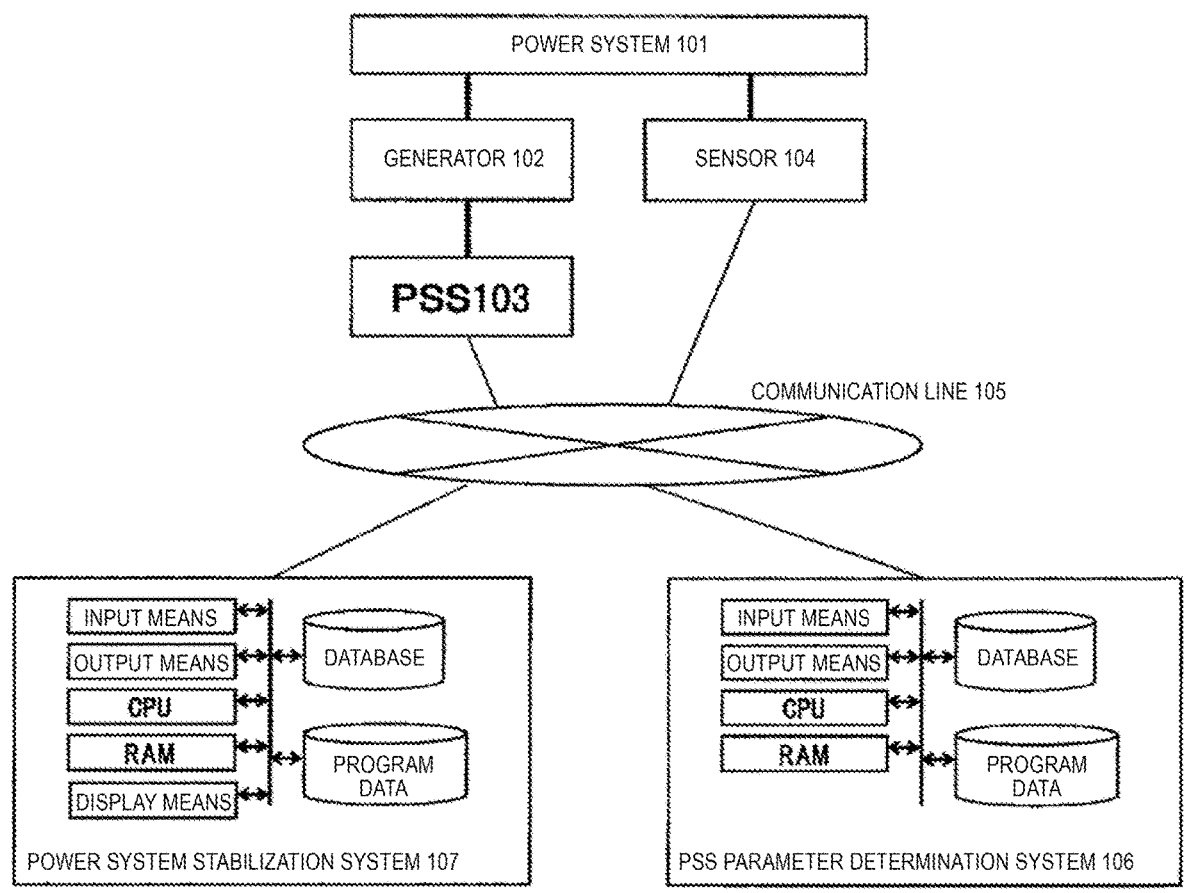

[Fig. 2]
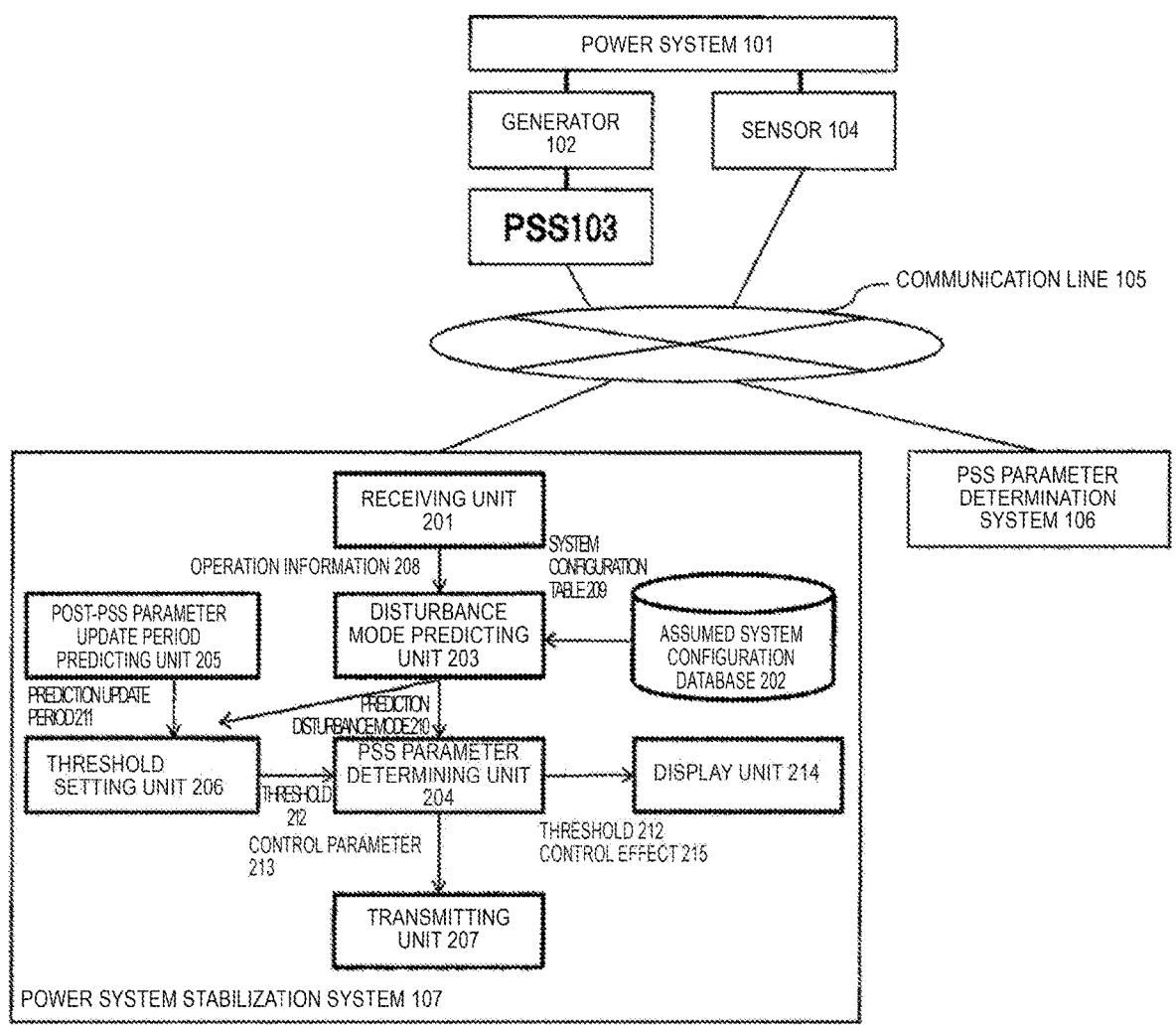

[Fig. 3]
POWER SYSTEM 101
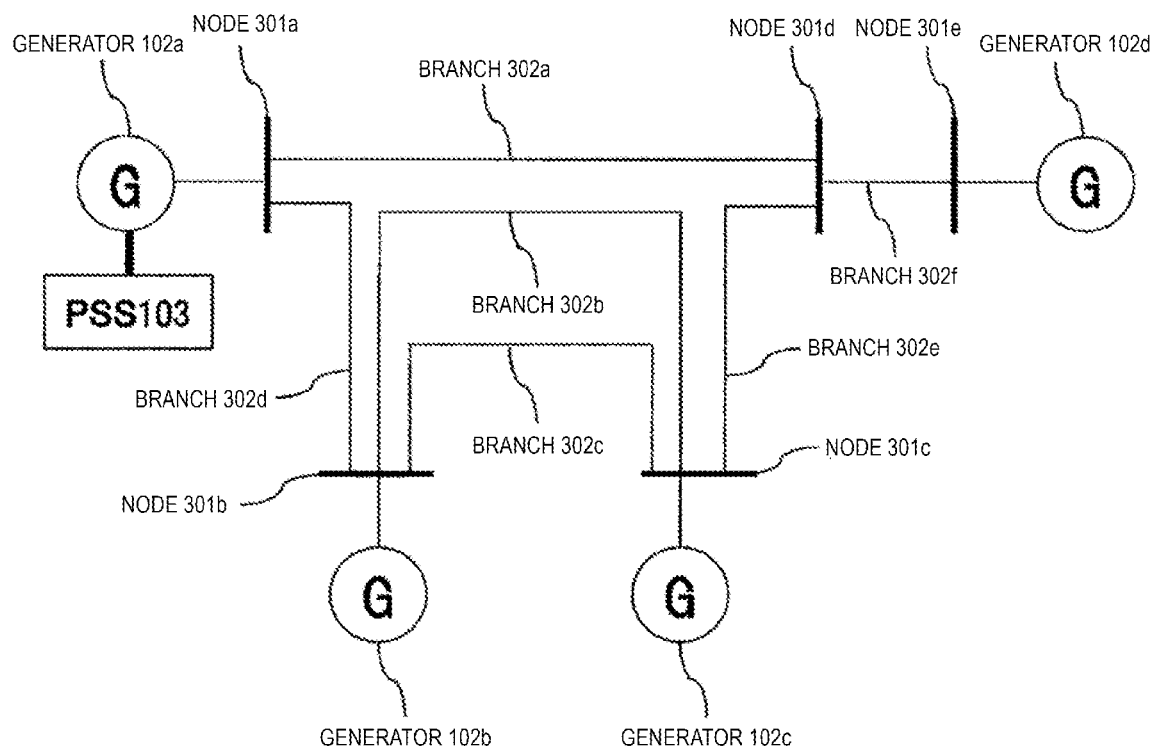

[Fig. 4]
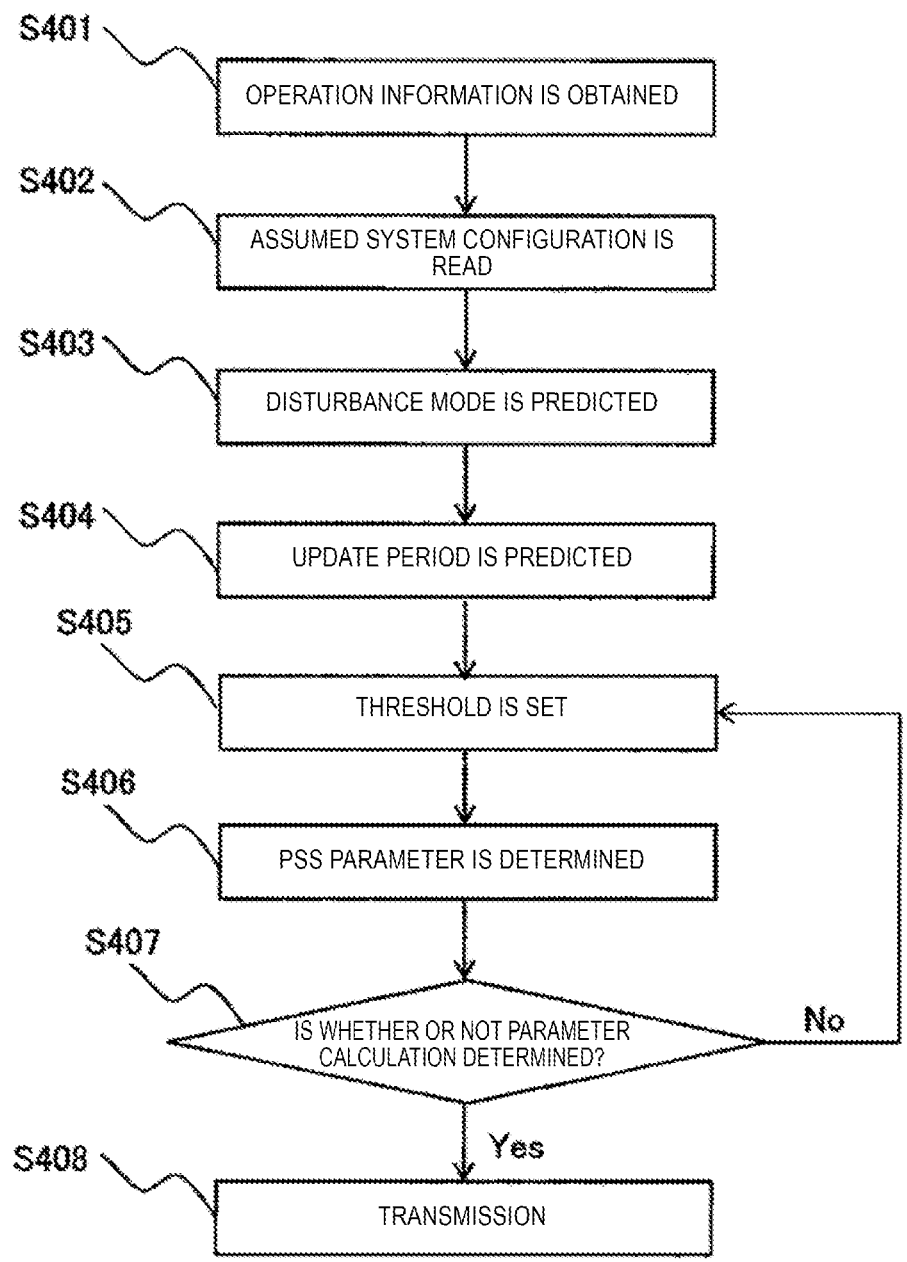

[Fig. 5]

| OBTAINMENT TIME | NODE 301a | | | | | NODE 301b |
| --- | --- | --- | --- | --- | --- | --- |
| | VOLTAGE (p.u.) | CURRENT (p.u.) | POWER FACTOR | ACTIVE POWER (MW) | REACTIVE POWER (Mvar) | ••• |
| 2014/12/29/ 21:00 | 1.01 | 0.90 | 0.99 | 1000 | 142 | ••• |
| ••• | ••• | ••• | ••• | ••• | ••• | ••• |

[Fig. 6]

| CASE | | CASE 1 | CASE 2 | CASE 3 | ••• |
| --- | --- | --- | --- | --- | --- |
| NODE LIST | 301a | 1 | 1 | 1 | ••• |
| | 301b | 1 | 1 | 1 | ••• |
| | 301c | 1 | 1 | 1 | ••• |
| | 301d | 1 | 1 | 1 | ••• |
| | 301e | 1 | 1 | 0 | ••• |
| BRANCH LIST | 302a | 1 | 1 | 1 | ••• |
| | 302b | 1 | 1 | 1 | ••• |
| | 302c | 1 | 0 | 1 | ••• |
| | 302d | 1 | 1 | 1 | ••• |
| | 302e | 1 | 1 | 1 | ••• |
| | 302f | 1 | 1 | 0 | ••• |
| GENERATOR LIST | 102a | 1 | 1 | 1 | ••• |
| | 102b | 1 | 1 | 1 | ••• |
| | 102c | 1 | 1 | 1 | ••• |
| | 102d | 1 | 1 | 0 | ••• |

[Fig. 7]
| CASE | CASE 1 | | CASE 2 | | CASE 3 | | ... |
|---|---|---|---|---|---|---|---|
| ITEM | $\lambda$ | $\omega$ | $\lambda$ | $\omega$ | $\lambda$ | $\omega$ | ... |
| DISTURBANCE MODE | 1.00 | 0.82 | -0.2 | 3.11 | 2.03 | 4.10 | ... |
| | ... | ... | ... | ... | ... | ... | ... |
[Fig. 8]
| STABILIZATION DEVICE | PREDICTION UPDATE PERIOD (s) |
|---|---|
| PSS | 60 |
| ... | ... |
[Fig. 9]
| ITEM | THRESHOLD ($s^{-1}$) |
|---|---|
| VALUE | 0.017 |
[Fig. 10]
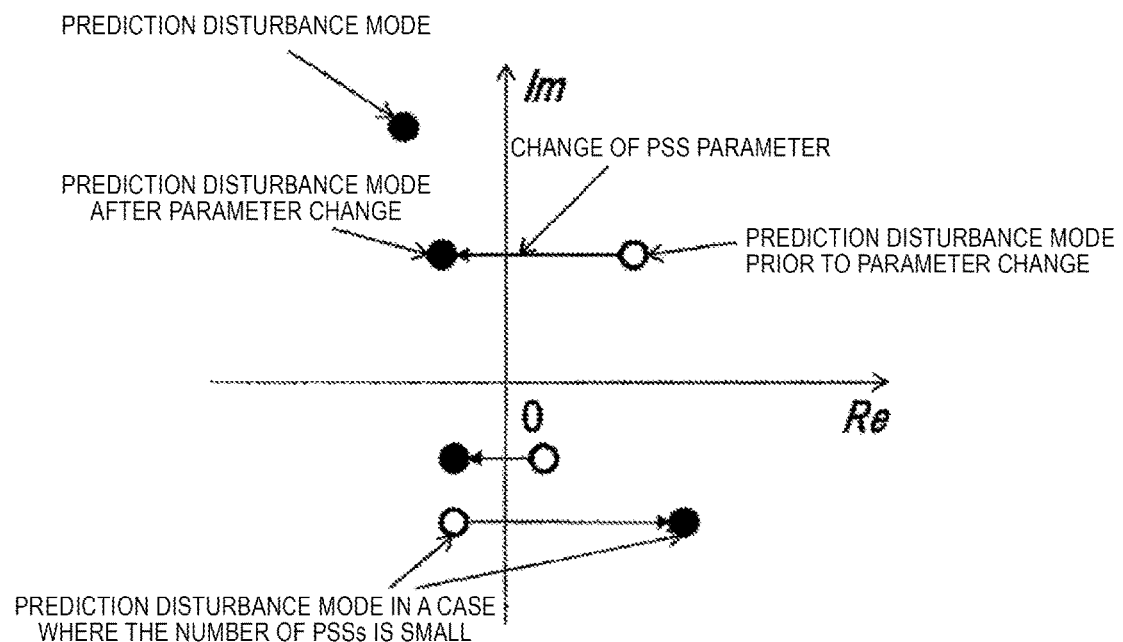

[Fig. 11]
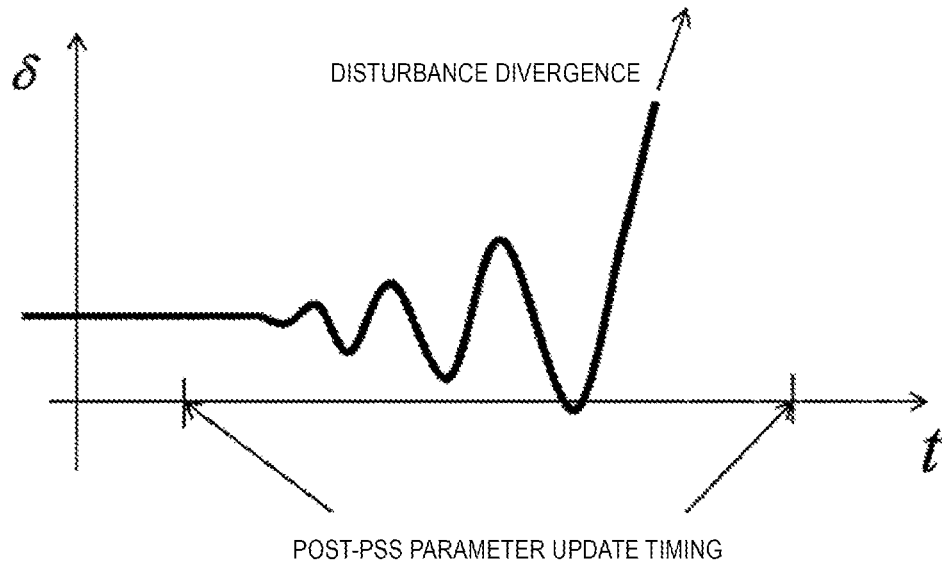
[Fig. 12]
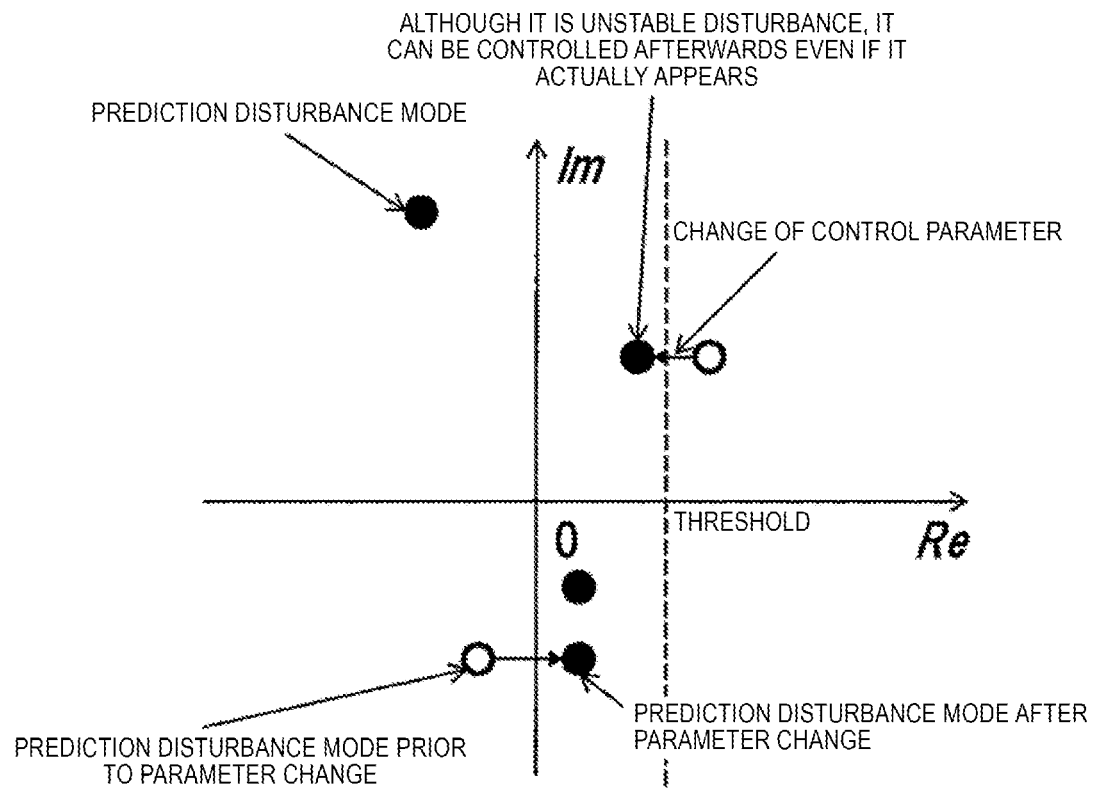

[Fig. 13]
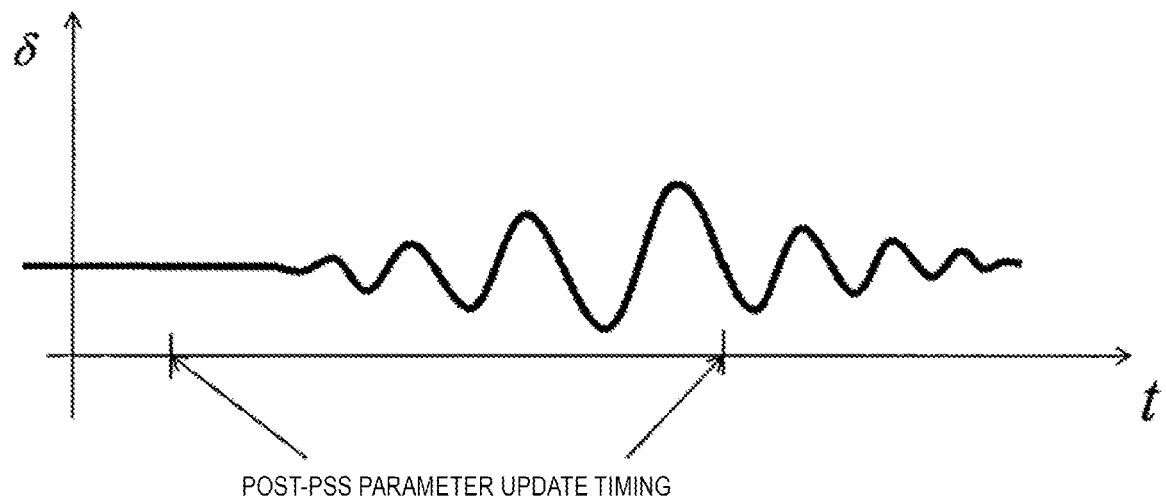
[Fig. 14]
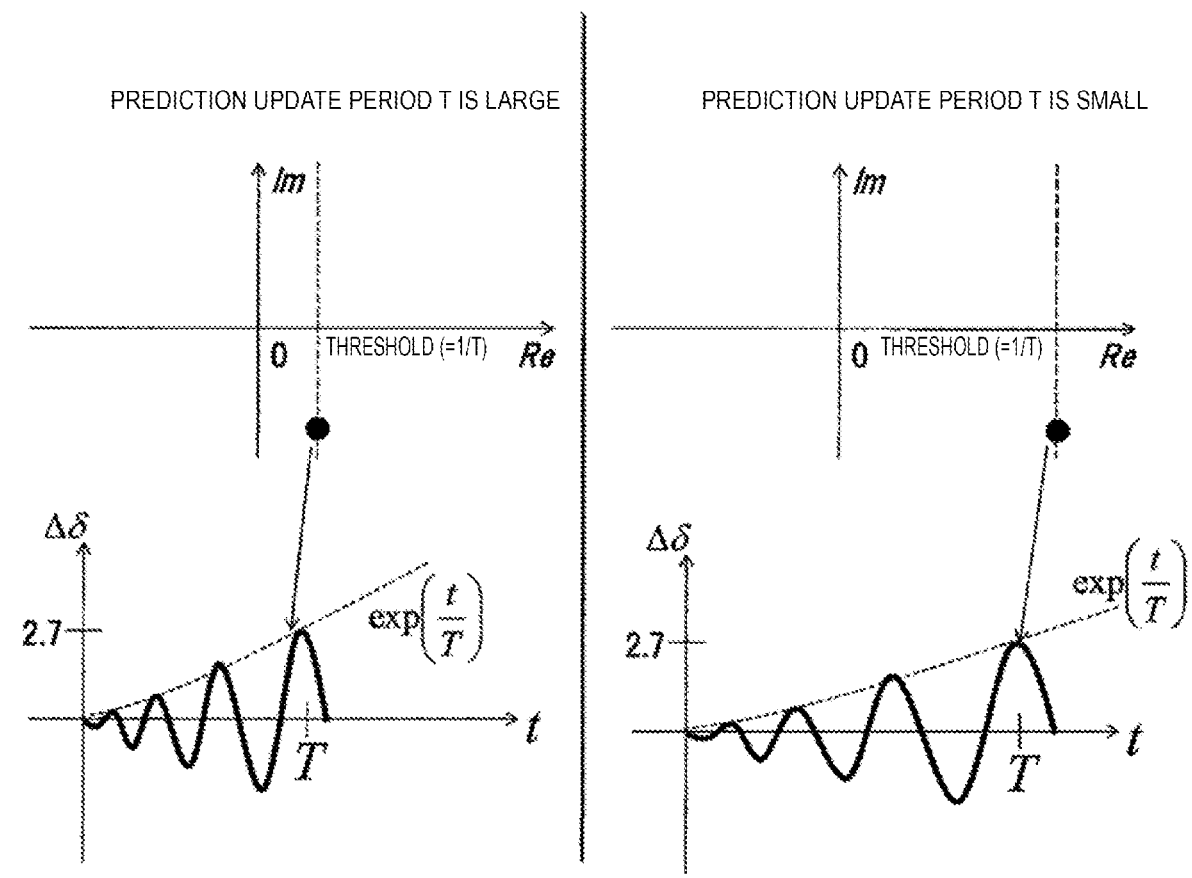

[Fig. 15]
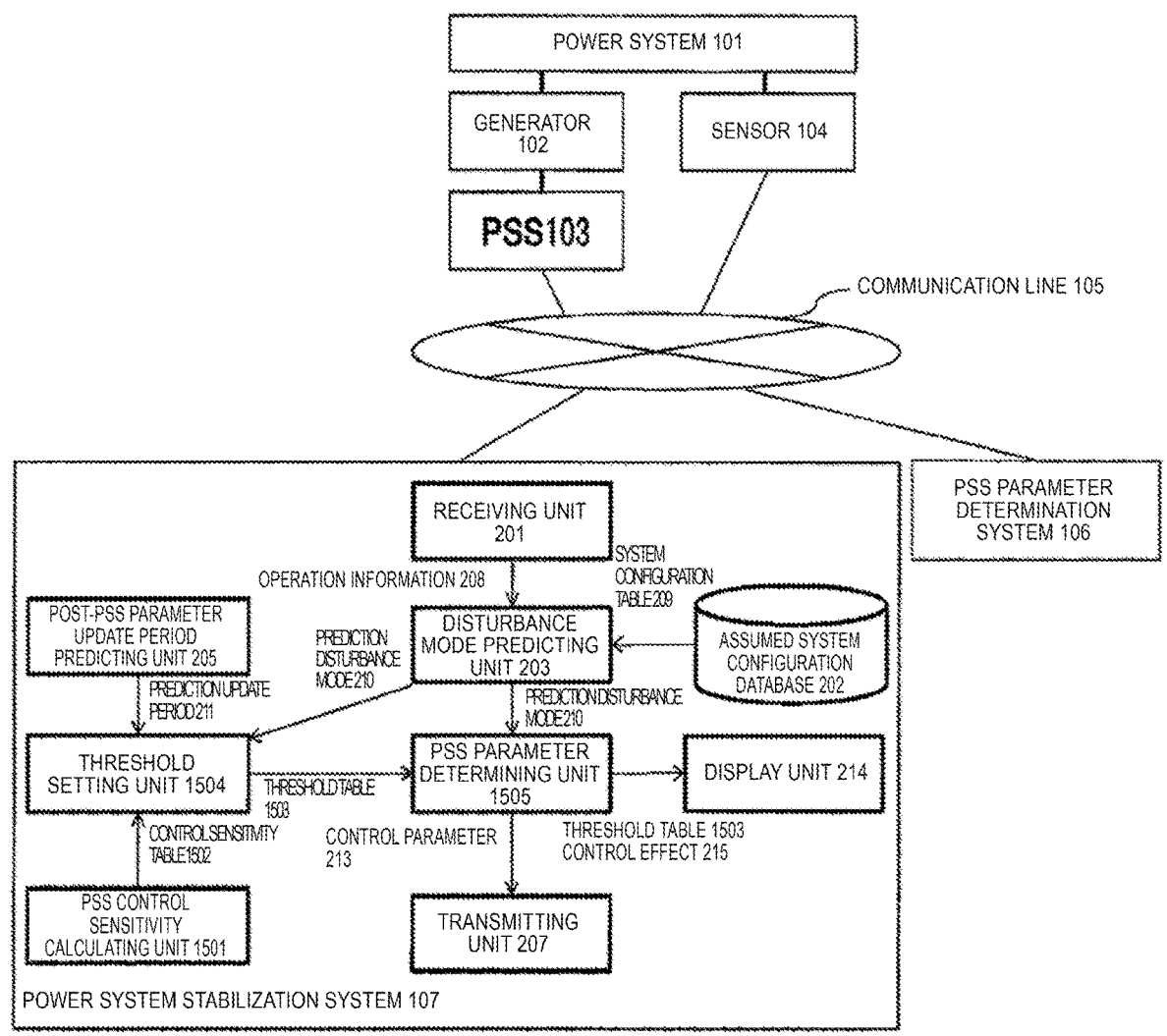

[Fig. 16]
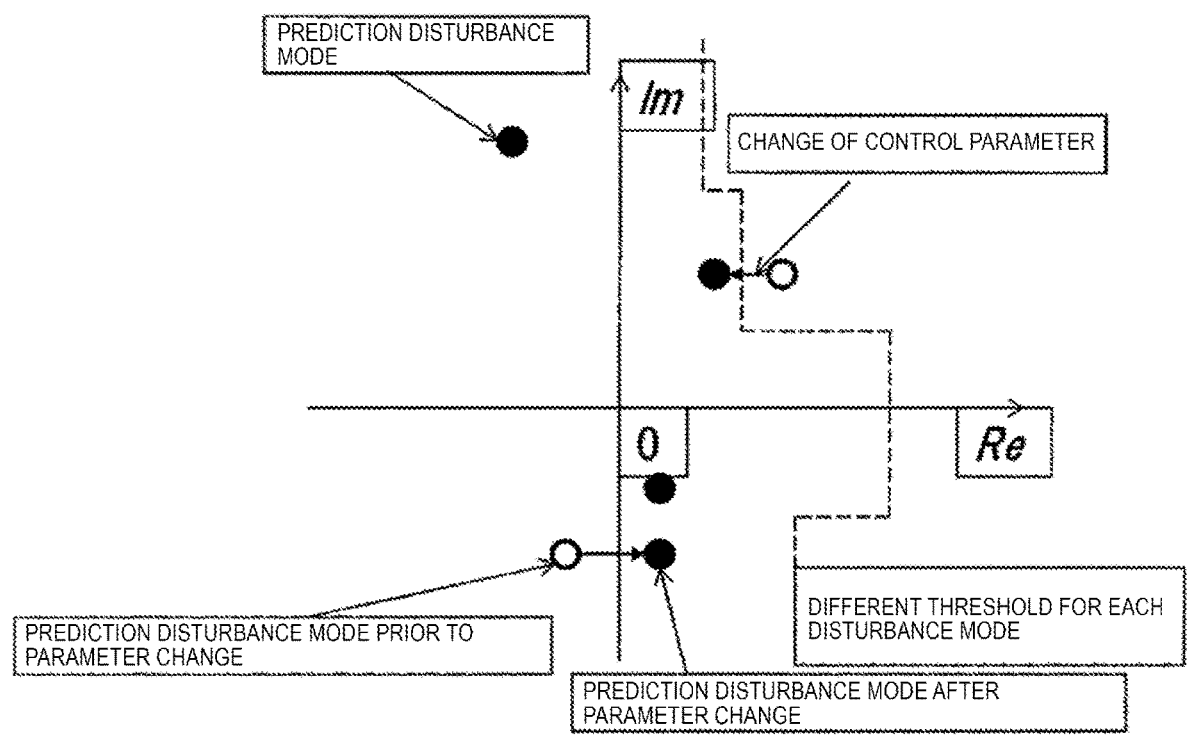

[Fig. 17]
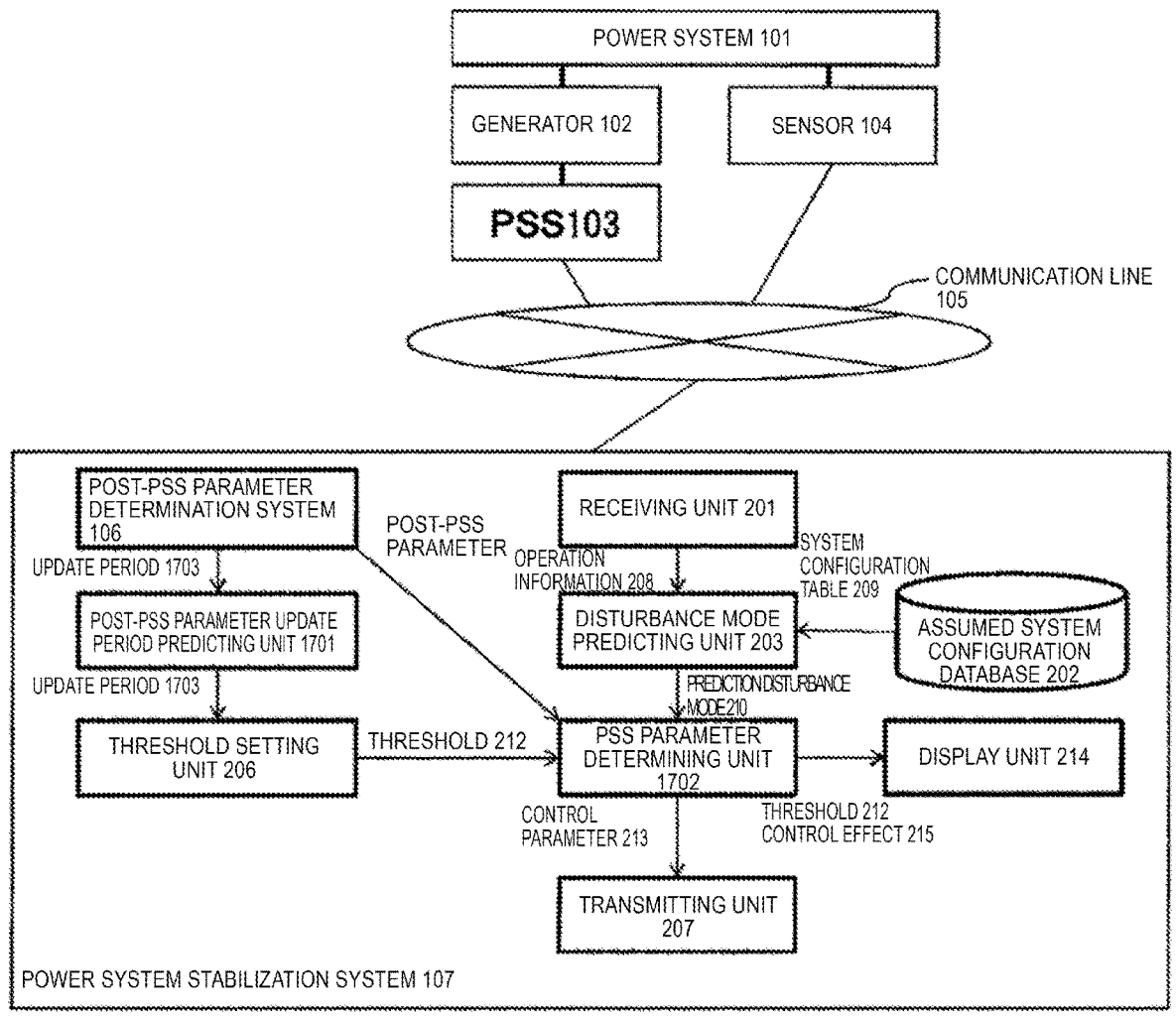

POWER SYSTEM STABILIZATION SYSTEM AND METHOD

TECHNICAL FIELD

The present invention relates to a power system stabilization system and method of maintaining synchronous stability in a power system.

BACKGROUND ART

There are a plurality of types of stability of the power system, which are synchronous stability, voltage stability, and frequency stability. The synchronous stability among them is caused by the main generator of the power system being a synchronous generator. Although a phase of a rotor of the synchronous generator differs depending on a position of the power system, basically, a synchronous operation is performed at the same rotational speed. However, when a disturbance such as a ground fault occurs in the power system, the power system is disturbed. When this disturbance is expanded and spread, the generator cannot be synchronized and will go an uncontrolled state.

To suppress the disturbance of the power system, the stabilization device of controlling the stability to be maintained is installed in the power system. For example, by changing an excitation voltage of the generator by the stabilization device, by changing active power output or reactive power output in a power storage device including a battery, or by changing the impedance of a variable impedance type series capacitor, it is possible to accelerate attenuation of the disturbance of the system.

This stabilization device detects a signal that is changed according to the disturbance of the system, for example, line power flow and frequency deviation, and outputs a control signal for applying a gain and phase compensation with respect to the signal. In control parameters such as the magnitude of the gain and a time constant of the phase compensation, the suppressing effect of the disturbance varies depending on a signal input to the stabilization device and a control target of the stabilization device, or an operation state of the power system. For this reason, a method for determining the control parameter of the stabilization device is studied, and there is a technology described in Japanese Patent Application No. 11-222545. In this publication, there is a description of a control technology which effectively suppresses the disturbance of the system by a minimum control input signal, by performing a control configuration of the stabilization device and parameter determination based on observability evaluation by a disturbance mode analysis and controllability evaluation by a sensitivity analysis.

CITATION LIST

Patent Literature

PTL 1: Japanese Patent Application No. 11-222545

SUMMARY OF INVENTION

Technical Problem

However, in the technology described in PTL 1, it is possible to determine a control parameter by extracting a disturbance mode in which a plurality of accident conditions is assumed by a system simulation device. However, when the accident condition to be assumed increases, an uncontrollable disturbance mode appears by deviating a threshold relating to a divergence constant prior to an update period.

Solution to Problem

In order to solve the problems, according to the present invention, provided is a power system stabilization system of determining a control parameter of a control device connected to a power system, the system including: a disturbance mode predicting unit that predicts a disturbance mode of the power system based on operation information and an assumed system configuration of the power system; a post-control parameter update period predicting unit that predicts an update period for a post-control parameter in post-control after a disturbance occurs; a threshold setting unit that sets a threshold relating to a divergence constant based on the disturbance mode and the update period for the post-control parameter; and a control parameter determining unit that determines the control parameter of the control device based on the disturbance mode and the threshold.

Advantageous Effects of Invention

According to the present invention, by adjusting the threshold with respect to the divergence constant in the disturbance mode by using an update period of the control parameter in post-control, it is possible to robustly suppress the disturbance with respect to a change of an operation state of the power system and a change of a communication environment, as more disturbance modes to be controlled.

BRIEF DESCRIPTION OF DRAWINGS

FIG. 1 is a system configuration diagram of a power system stabilization system in an embodiment of the present invention.

FIG. 2 is a functional configuration diagram of the power system stabilization system in the embodiment of the present invention.

FIG. 3 is a schematic diagram of a power system to which the power system stabilization system is applied.

FIG. 4 is a process flow diagram of the power system stabilization system.

FIG. 5 is a diagram illustrating an example of operation information.

FIG. 6 is a diagram illustrating an example of an assumed system configuration table.

FIG. 7 is a diagram illustrating an example of a prediction disturbance mode.

FIG. 8 is a diagram illustrating an example of a prediction update period.

FIG. 9 is a diagram illustrating an example of a threshold.

FIG. 10 is a diagram illustrating a disturbance mode of the power system in a case where the present invention is not implemented.

FIG. 11 is a diagram illustrating a disturbance waveform of the power system in the case where the present invention is not implemented.

FIG. 12 is a diagram illustrating the disturbance mode of the power system in a case where the present invention is implemented.

FIG. 13 is a diagram illustrating a disturbance waveform of the power system in the case where the present invention is implemented.

FIG. 14 is a diagram illustrating a relationship of the prediction update period, the threshold, and the disturbance mode.

FIG. 15 is a functional configuration diagram of the power system stabilization system in Embodiment 2.

FIG. 16 is a diagram illustrating an example of the effect of the power system stabilization system in Embodiment 2.

FIG. 17 is a functional configuration diagram of the power system stabilization system in Embodiment 3.

DESCRIPTION OF EMBODIMENTS

Embodiment 1

Hereinafter, a preferable embodiment in which the present invention is implemented will be described. It should be noted that the following are merely examples of implementation and are not intended to limit the invention itself to the following specific contents.

FIG. 1 is a diagram illustrating a system configuration example of a case where a power system stabilization system of the present invention is operated as a power system stabilizer (PSS) which applies an auxiliary signal to an excitation voltage control device of a generator. As an example, a control target of a stabilization device is a generator, but may be a device capable of outputting active power and reactive power such as a power storage device and power electronics equipment for DC series, and may be a device capable of changing impedance in a power system such as a high-speed cutoff machine and a variable impedance type series capacitor. A generator 102 and a sensor 104 are connected to a power system 101. A PSS 103 is connected to the generator 102. The PSS 103 is connected to a post-PSS parameter determination system 106 and a power system stabilization system 107 through a communication line 105. Each of the post-PSS parameter determination system 106 and the power system stabilization system 107 is configured with input means, output means, a CPU, a RAM, a database, a program, and the like, and the power system stabilization system 107 further includes a display device.

FIG. 2 is a diagram illustrating a functional configuration example relating to program data and the database in the power system stabilization system 107. First, after a function of the post-PSS parameter determination system 106 is described, a function of the power system stabilization system 107 will be described while describing an operation for the post-PSS parameter determination system 106.

In Embodiment 1, the post-PSS parameter determination system 106 is a parallel system of the power system stabilization system 107. It is conceivable that this PSS parameter determination system 106 processes the power system stabilization system 107 with separated or same software. In addition, the power system stabilization system 107 includes a new element, but the post-PSS parameter determination system 106 is configured with an existing element.

The post-PSS parameter determination system 106 obtains disturbance that occurs in the power system 101 from the sensor 104, analyzes a disturbance mode that occurs on the system, and determines a PSS parameter so as to attenuate the disturbance with respect to the analyzed disturbance mode. For example, in the analysis in the disturbance mode, a method of analyzing a frequency, an attenuation rate, and the spectrum of the disturbance mode are used as in the Prony analysis. A large disturbance mode of the spectrum, a small attenuation rate, or an unstable disturbance mode with a negative attenuation rate is selected by the frequency, the attenuation rate, and the spectrum of the disturbance mode obtained by the analysis, and a PSS parameter of a time constant or the like of again and phase compensation is determined so as to increase the attenuation rate in the frequency in the disturbance mode. The post-PSS parameter determination system 106 defines the PSS parameter determined after the disturbance occurrence as a post-PSS parameter.

Meanwhile, the power system stabilization system 107 determines the PSS parameter so as not to diverge the disturbance mode that occurs on the power system in a shorter time than the update period of the post-PSS parameter while predicting an update period of the post-PSS parameter by the post-PSS parameter determination system 106. Hereinafter, a function thereof will be described.

The power system stabilization system 107 is configured from functions of a receiving unit 201, an assumed system configuration database 202, a disturbance mode predicting unit 203, a PSS parameter determining unit 204, a post-PSS parameter update period predicting unit 205, a threshold setting unit 206, a transmitting unit 207, and a display unit 214.

The receiving unit 201 obtains operation information 208 in each position in the power system 101 by the sensor 104. For example, the operation information 208 is power flow information such as the active power, the reactive power, a voltage, and a current in a substation or a power plant present in the power system 101, switching information of a switch in a switchgear, and the like.

The assumed system configuration database 202 holds an assumed system configuration table 209. The assumed system configuration table 209 is configured from a system topology list, a generator list, a substation list, and the like in the power system 101. Furthermore, the assumed system configuration table 209 includes a list corresponding to an operating condition of a case where a change operation of an assumed system configuration for power flow control or the like is performed, and a list corresponding to an operating condition of a case where a disconnection operation of the power transmission line is performed when a ground fault accident or the like occurs in the power system 101, and the like, in addition to a list corresponding to an operating condition of the power system 101 in operation.

The disturbance mode predicting unit 203 obtains each of the operation information 208 from the receiving unit 201 and the assumed system configuration table 209 from the assumed system configuration database 202, and outputs a prediction disturbance mode 210. The prediction disturbance mode 210 indicates the period of disturbance expected to occur in the power system 101, convergence and divergence, and corresponds to, for example, an eigenvalue in the power system. As a method of calculating the prediction disturbance mode 210, there is a method or the like in which, for example, the power system 101 connected to the generator 102 and the PSS 103 is described as a state equation shown in Equation 1, the coefficient matrix is transformed into the determinant as shown in Equation 2 and the eigenvalue is analyzed, and then an eigenvalue analysis is performed. The prediction disturbance mode 210 obtained as the eigenvalue has a form as shown in Equation 3.

$$\dot{x}=Ax \qquad \text{[Equation 1]}$$

x is a state vector in the power system, and a state variable indicating a state of the power system such as a rotor phase difference angle and a voltage of the generator is an element. Derivative of x yields Ax, and A represents a coefficient matrix of a state equation.

$$|\lambda I - A| = 0 \qquad \text{[Equation 2]}$$

I is a unit matrix, λ is the eigenvalue. The eigenvalue is an unknown, but can be obtained by calculating the determinant of Equation 2.

$$\lambda = \sigma \pm j\omega \qquad \text{[Equation 3]}$$

σ is the reciprocal of the divergence or convergence time constant in the disturbance mode. If σ is positive, the disturbance mode diverges. If a value at the positive of σ is large, the divergence occurs for a short time, and if the value at negative is small, the divergence occurs for a long time. If σ is negative, the disturbance mode converges. If σ is the negative and the value is large, the convergence occurs for a long time, and if the value is small, the convergence occurs for a short time. In a case where σ is 0, neither convergence nor divergence occurs. ω is the frequency of the disturbance in the disturbance mode.

The post-PSS parameter update period predicting unit 205 calculates a prediction value of the update period of the post-PSS parameter delivered by the post-PSS parameter determination system 106, and outputs a prediction update period 211. For example, if the update period of the post-PSS parameter is constant, a next update period is predicted by using a past update period. Meanwhile, in a case where the update period of the post-PSS parameter is changed by a communication traffic state of the communication line 105, the past update period and communication traffic are monitored, and the next update period is predicted. Even in a case where a communication state is changed based on a periphery environment, it is possible to calculate a highly accurate value by predicting and changing update period.

The threshold setting unit 206 sets a threshold 212 to allow for a divergence constant of the prediction disturbance mode 210 by using the prediction update period 211. For example, it is assumed that the prediction update period 211 is obtained at a T second. This means that the post-PSS parameter is updated with a T second interval. Accordingly, a threshold allowed for σ that is the reciprocal of the divergence or the convergence time constant in the disturbance mode is set based on the T second. The reason for the processing is that if σ is smaller than T, the disturbance mode diverges prior to updating of the PSS parameter and cannot be controlled.

The PSS parameter determining unit 204 determines a PSS parameter 213 and a control effect 215 by using the prediction disturbance mode 210 and the threshold 212. Since the PSS parameter 213 affects σ of the prediction disturbance mode 210, a constrained optimization problem can be solved so as to satisfy the threshold 212, or the PSS parameter 213 can be obtained by utilizing state feedback control by which an arbitrary eigenvalue is obtained. For example, the control effect 215 is disturbance mode information or the like after control in a case where the prediction disturbance mode 210 and the PSS parameter 213 are applied to the power system.

The transmitting unit 207 transmits the PSS parameter 213 to the PSS 103 through the communication line 105.

The display unit 214 displays information relating to the threshold 212 and the control effect 215 on a screen. By this display, it is possible to notify an operator of the unstable disturbance mode so as to pay attention to the operation.

FIG. 3 is a schematic diagram of the power system 101. Hereinafter, nodes 301a to 30e are referred to as a node 301 unless distinguished from each other, and the branches 302a to 302f are referred to as a branch 302 unless distinguished from each other. The power system 101 is configured with a plurality of nodes 301 and a plurality of branches 302, and the nodes 301 correspond to the substation, a switchgear, or the like presenting on the power system. The generator 102 is connected to the node 301. The branches 302 correspond to power transmission lines on the power system, and the impedance corresponding to each of the power transmission lines is set. FIG. 4 is a diagram illustrating an example of processes from a process in which the power system stabilization system 107 obtains the operation information 208 of the power system to a process in which the PSS parameter is transmitted as a flowchart.

First, in step S401, the disturbance mode predicting unit 203 obtains the operation information 208 of the power system by the receiving unit 201.

Next, in step S402, the disturbance mode predicting unit 203 obtains an assumed system configuration 209 by the assumed system configuration database 202.

Next, in step S403, the disturbance mode predicting unit 203 predicts the disturbance mode by using the operation information 208 and the assumed system configuration 209, and outputs the prediction disturbance mode 210 to the threshold setting unit 206 and the PSS parameter determining unit 204.

Next, in step S404, the post-PSS parameter update period predicting unit 205 predicts the parameter update period of the post-PSS parameter determination system 106, and outputs the prediction update period 211 to the threshold setting unit 206.

Next, in step S405, the threshold setting unit 206 calculates the threshold 212 allowed based on the divergence constant of the prediction disturbance mode 210 by the prediction disturbance mode 210 and the prediction update period 211, and outputs the calculated result to the PSS parameter determining unit 204.

Next, in step S406, the PSS parameter determining unit 204 calculates the PSS parameter 213 by the prediction disturbance mode 210 and the threshold 212.

Next, in step S407, the PSS parameter determining unit 204 determines whether the PSS parameter 213 can be calculated. In a case where the PSS parameter 213 can be calculated (Yes), the process proceeds to step S408. In a case where the PSS parameter 213 cannot be calculated (No), the process returns to step S405, resetting is done so as to decrease the threshold, and the PSS parameter is calculated again.

In step S408, the transmitting unit 207 outputs the PSS parameter 213 to the PSS through the communication line 105.

FIG. 5 is a diagram illustrating an example of the operation information 208. The operation information 208 is configured with a voltage, a current, power factor information in each node, and the active power and reactive power flow in each branch.

FIG. 6 is a diagram illustrating an example of the assumed system configuration table 209. For example, the assumed system configuration table 209 is configured with a node list, a branch list, and the generator list. For example, a case of the system configuration shown in FIG. 3 is the same as that of a list of a case 1 of the first column. Meanwhile, a case of a state where it is assumed that the branch 302c is open by a ground fault accident is the same as that of a list of a case 2 of the second column. Alternately, a case where it is assumed that the branch 302f is broken due to an accident and the node 301e and the generator 102d are disconnected from the system is the same as that of a list of a case 3 of the third column. As described above, the assumed system configuration table 209 is obtained by integrating system configuration lists corresponding to the assumed cases.

FIG. 7 is a diagram illustrating an example of the prediction disturbance mode 210. The prediction disturbance mode 210 is configured with the list of the disturbance mode corresponding to each case in the assumed system configuration table. For example, as indicated in Equation 3, the disturbance mode is expressed by the real part and the imaginary part of the eigenvalue and corresponds to the reciprocal of the divergence or convergence time constant and the disturbance frequency in the disturbance mode.

FIG. 8 is a diagram illustrating an example of the prediction update period 211. The prediction update period 211 is configured with the update period of the post-PSS parameter of the PSS.

FIG. 9 is a diagram illustrating an example of the threshold 212. The threshold 212 is configured with the threshold corresponding to the update period of the post-PSS parameter.

FIG. 10 is a diagram illustrating an example of the disturbance mode of the power system by using an eigenvalue plane in a case where the present invention is not implemented. The horizontal axis is the real part of the eigenvalue, and the vertical axis is the imaginary part of the eigenvalue. The real part of the eigenvalue corresponds to the reciprocal of the divergence or convergence time constant, and the imaginary part of the eigenvalue corresponds to the disturbance frequency. In the case where the present invention is not implemented, when the PSS parameter is determined so that the disturbance is attenuated, that is, the real part of the eigenvalue becomes negative, the disturbance mode appears toward a direction in which the disturbance therein diverges, that is, a positive direction in which the real part of the eigenvalue appears. If the number of PSSs is sufficient, the divergence of the disturbance can be suppressed by determining the PSS parameter to attenuate the disturbance mode toward a divergence direction. However, in a case where the number of the PSSs is small compared to the number of the disturbance modes, it is impossible to suppress the disturbance mode toward the divergence direction.

As a result, as illustrated in FIG. 11, the disturbance diverges prior to updating of the post-PSS parameter by the post-PSS parameter determination system. When the disturbance diverges, a synchronous operation between the generators becomes difficult, and the generator is in an uncontrolled state. The uncontrolled state of the generator is spread in chains to other generators on the power system, and in the worst case, a large blackout occurs throughout the power system.

FIG. 12 is a diagram illustrating an example of the disturbance mode of the power system of a case where the present invention is implemented by using the eigenvalue plane. Similar to FIG. 10, the horizontal axis is the real part of the eigenvalue, and the vertical axis is the imaginary part of the eigenvalue. In the case where the present invention is implemented, σ that is the reciprocal of the divergence or convergence time constant allowed for the disturbance mode, that is, the threshold of the real part of the eigenvalue is set according to the update period of the post-PSS parameter. In the case where the present invention is not implemented, the real part of the eigenvalue is a negative value. However, in the case where the present invention is implemented, since the threshold of the real part of the eigenvalue decreases until the positive value, it is possible to control more disturbances as control targets. In addition, since the value of σ that is the positive value decreases and a time until the divergence increases, it is possible to further control the threshold in the next update period of the post-PSS parameter and to perform post-control in a convergence direction. That is, even in a case where the number of the PSSs is small compared to the number of the disturbance modes, it is possible to prevent sudden divergence of the disturbance.

As a result, as illustrated in FIG. 13, it is possible to avoid a state where the disturbance diverges prior to the updating of the post-PSS parameter by the post-PSS parameter determination system. Accordingly, when the post-PSS parameter is updated, since the disturbance occurring on the power system is suppressed, it is possible to robustly suppress the disturbance with respect to change of the system configuration and change of a communication environment.

FIG. 14 illustrates an example of a relationship between the prediction update period 211, the threshold 212, and the disturbance mode. In a case where the prediction update period 211 is short, the threshold 212 becomes large and sudden divergence in the disturbance mode is allowed. In a case where the prediction update period 211 is long, the threshold 212 becomes small and gentle divergence in the disturbance mode is allowed.

As described in the FIG. 10 to FIG. 14, in this embodiment, the update period of the post-PSS parameter is predicted, and the threshold allowed for the divergence constant in the disturbance mode is set, whereby it is possible to robustly suppress the disturbance with respect to the change of the system configuration and the change of the communication environment, as more disturbance modes which can be controlled.

Embodiment 2

In Embodiment 2, a case where the threshold setting unit sets the threshold based on different divergence constant for each disturbance mode in which the PSS different from the update period of the post-PSS parameter can be suppressed will be described.

FIG. 15 is a functional configuration diagram of Embodiment 2. Functions of the power system 101, the generator 102, the PSS 103, the sensor 104, the communication line 105, the post-PSS parameter determination system 106, the receiving unit 201, the assumed system configuration database 202, the disturbance mode predicting unit 203, the post-PSS parameter update period predicting unit 205, and the transmitting unit 207 of FIG. 15 are the same as those of Embodiment 1. Functions of the threshold setting unit 206 and the PSS parameter determining unit 204 are partially different from Embodiment 1. In addition, a PSS control sensitivity calculating unit 1501 is newly added.

The PSS control sensitivity calculating unit 1501 causes the disturbance mode and the PSS capable of controlling the disturbance mode in the descending order of control sensitivity to be listed, and outputs a control sensitivity table 1502 by evaluating the controllability of each PSS.

In Embodiment 2, a threshold setting unit 1504 sets the threshold based on different divergence constant for each disturbance mode which can be suppressed by the PSS different from the update period of the post-PSS parameter by the prediction update period 211, the prediction disturbance mode 210, and the control sensitivity table 1502, and outputs the set threshold as a threshold table 1503. In Embodiment 1, the threshold setting unit 206 outputs one threshold with respect to the whole of the disturbance modes. However, in Embodiment 2, the threshold setting unit 1504 outputs the threshold for each disturbance mode.

In Embodiment 2, a PSS parameter determining unit 1505 uses the different threshold as a constraint condition for each disturbance mode, and determines the PSS parameter and control effect by the prediction disturbance mode 210 and the threshold table 1503. The algorithm used for a method of determining the PSS parameter is the same as that of Embodiment 1, and the PSS parameter determining unit 204 determines the PSS parameter with respect to one threshold in Embodiment 1. However, the PSS parameter determining unit 1505 in this embodiment determines the PSS parameter by using a plurality of the thresholds.

In Embodiment 2, an example of the effect of the power system stabilization system is illustrated in FIG. 16. According to the update period of the post-PSS parameter, a different threshold is set for each disturbance mode. The PSS parameter determining unit 204 determines the PSS parameter so as to satisfy the threshold.

By this embodiment, even in a case where the update period of the post-PSS parameter is different for each PSS, it is possible to robustly suppress the disturbance.

Embodiment 3

In Embodiment 3, a case where a function of the post-PSS parameter determination system is included in the power system stabilization system will be described.

FIG. 17 is a functional configuration diagram of Embodiment 3. Functions of the power system 101, the generator 102, the PSS 103, the sensor 104, the communication line 105, the post-PSS parameter determination system 106, the receiving unit 201, the assumed system configuration database 202, the disturbance mode predicting unit 203, the threshold setting unit 206, and the transmitting unit 207 in FIG. 16 are the same as those of Embodiment 1. Functions of a post-PSS parameter update period predicting unit 1701 and a PSS parameter determining unit 1702 are partially different from Embodiment 1.

In Embodiment 3, since the post-PSS parameter determination system 106 is included in the power system stabilization system 107, the post-PSS parameter update period predicting unit 1701 directly obtains an update period 1703 of the post-PSS parameter by the post-PSS parameter determination system 106, and may output the obtained update period to the threshold setting unit 206.

In Embodiment 3, in the PSS parameter determining unit 1702, in addition to the prediction disturbance mode 210, the PSS parameter and the control effect are determined by using the post-PSS parameter calculated by the post-PSS parameter determination system 106. Specifically, the PSS parameter for which the post-PSS parameter is calculated is a fixed value and the PSS parameter for only the PSS for which the post-PSS parameter is not calculated is determined as a target.

By this embodiment, it is possible to prevent sudden divergence of other disturbance modes without interfering with disturbance suppression due to the post-PSS parameter.

REFERENCE SIGNS LIST

101 power system
102 generator
103 PSS
104 sensor
105 communication line
106 post-PSS parameter determination system
107 power system stabilization system
201 receiving unit
202 assumed system configuration database
203 disturbance mode predicting unit
204 PSS parameter determining unit
205 post-PSS parameter update period predicting unit
206 threshold setting unit
207 transmitting unit
208 operation information
209 assumed system configuration table
210 prediction disturbance mode
211 prediction update period
212 threshold
213 PSS parameter
214 display unit
215 control effect
301 node
302 branch
1501 PSS control sensitivity calculating unit
1502 control sensitivity table
1503 threshold table
1504 threshold setting unit
1505 PSS parameter determining unit
1701 post-PSS parameter update period predicting unit
1702 PSS parameter determining unit
1703 update period

The invention claimed is:

1. A power system stabilization system of determining a power system stabilizer (PSS) parameter of a PSS connected to a power system, the power system stabilization system comprising:
   a disturbance mode predicting unit that predicts a disturbance mode of the power system based on operation information and an assumed system configuration of the power system;
   a post-PSS parameter update period predicting unit that predicts an update period for a post-PSS parameter in post-control after a disturbance occurs;
   a threshold setting unit that sets a threshold relating to a divergence constant based on the disturbance mode and the update period for the post-PSS parameter;
   a PSS parameter determining unit that determines the PSS parameter of the PSS based on the disturbance mode and the threshold;
   a receiving unit that obtains the operation information of the power system from a sensor;
   an assumed system configuration database that stores the assumed system configuration; and
   a transmitting unit that transmits the PSS parameter to the PSS;
   wherein the PSS outputs an auxiliary signal to an excitation voltage control device of a generator which synchronizes the generator to suppress the disturbance.

2. The power system stabilization system according to claim 1,
   wherein the post-PSS parameter update period predicting unit predicts a next update period of the post-PSS parameter based on a past update period for a post-PSS parameter.

3. The power system stabilization system according to claim 2,
   wherein the next update period of the post-PSS parameter is predicted based on communication traffic state.

4. The power system stabilization system according to claim 1,
   wherein the PSS parameter determining unit determines the PSS parameter such that the disturbance mode is within a constraint range by setting a threshold as a constraint.

5. The power system stabilization system according to claim 4,
wherein the PSS parameter determining unit determines the PSS parameter based on a state feedback control such that the disturbance mode is within the constraint range.

6. The power system stabilization system according to claim 1,
wherein the PSS parameter determining unit determines the PSS parameter and a control effect of applying the PSS parameter to the power system, based on the threshold and the disturbance mode.

7. The power system stabilization system according to claim 1,
wherein a voltage, a current, or information indicating an electric state similar to the voltage and the current in the power system is included in the operation information.

8. The power system stabilization system according to claim 1,
wherein system topology information and a generator list of the power system corresponding to an assumed accident or a system switching are included in the assumed system configuration.

9. The power system stabilization system according to claim 1,
wherein the disturbance mode is a mode based on an eigenvalue obtained from a coefficient matrix when the power system is expressed as a state equation or a differential equation.

10. The power system stabilization system according to claim 9,
wherein the threshold relating to the divergence constant is a threshold of a real part of the eigenvalue.

11. The power system stabilization system according to claim 1,
wherein the disturbance mode predicting unit calculates the eigenvalue by analyzing a coefficient matrix when the power system is expressed as a state equation or a differential equation.

12. The power system stabilization system according to claim 1, further comprising:
a display unit that displays information relating to the threshold, the disturbance mode, and the disturbance mode after applying the PSS parameter to the power system.

13. A power system stabilization method of determining a power system stabilizer (PSS) parameter of a PSS connected to a power system, the method comprising:
predicting a disturbance mode of the power system based on the power system of operation information of the power system received from a sensor and an assumed system configuration of the power system;
predicting an update period for a post-PSS parameter in post-control after a disturbance occurs;
setting a threshold relating to a divergence constant based on the disturbance mode and the update period for the post-PSS parameter;
determining the PSS parameter of the PSS based on the disturbance mode and the threshold; and
transmitting the PSS parameter to the PSS;
wherein the PSS outputs an auxiliary signal to an excitation voltage control device of a generator which synchronizes the generator to suppress the disturbance.

* * * * *